US010320794B2

(12) United States Patent
Miller et al.

(10) Patent No.: US 10,320,794 B2
(45) Date of Patent: Jun. 11, 2019

(54) SYSTEM FOR SHARING SELECTIVELY EPHEMERAL CONTENT

(71) Applicant: FLIPGRID, INC., Minneapolis, MN (US)

(72) Inventors: Charles Miller, Minneapolis, MN (US); Nathan Edwards, Minneapolis, MN (US); Brad Hosack, Minneapolis, MN (US); Luke Lecheler, Minneapolis, MN (US); James Leslie, Minneapolis, MN (US); Philip Soran, Minneapolis, MN (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 327 days.

(21) Appl. No.: 15/222,960

(22) Filed: Jul. 29, 2016

(65) Prior Publication Data
US 2017/0034173 A1 Feb. 2, 2017

Related U.S. Application Data

(60) Provisional application No. 62/262,253, filed on Dec. 2, 2015, provisional application No. 62/210,365, filed on Aug. 26, 2015, provisional application No. 62/198,594, filed on Jul. 29, 2015.

(51) Int. Cl.
*H04L 29/06* (2006.01)

(52) U.S. Cl.
CPC ............ *H04L 63/10* (2013.01); *H04L 63/068* (2013.01)

(58) Field of Classification Search
None
See application file for complete search history.

(56) References Cited

U.S. PATENT DOCUMENTS

| 7,035,854 | B2 | 4/2006 | Hsiao et al. | 707/999.001 |
| 7,594,258 | B2 | 9/2009 | Mao et al. | 726/9 |
| 8,463,813 | B2 | 6/2013 | Siress et al. | 707/781 |
| 8,555,078 | B2 | 10/2013 | Pravetz et al. | 713/185 |
| 8,572,686 | B2 | 10/2013 | Radhakrishnan | 726/2 |

(Continued)

FOREIGN PATENT DOCUMENTS

EP 2887246 12/2013 ............ 21/10

*Primary Examiner* — Henry Tsang
(74) *Attorney, Agent, or Firm* — NovoTechIP International PLLC

(57) ABSTRACT

An electronic device that provides long-lived, but selectively ephemeral access to content is described. In particular, the electronic devices may provide secure content, which was generated based on protection information and the content, to a computer system. After receiving a share command, the electronic device may communicate, to the computer system, a unique token that is associated with a recipient in a communication network and an instruction to enable a recipient electronic device associated with the recipient to view the content. This unique token may allow the computer system to access the content in the secure content, so that the computer system has an ability to provide the content to the recipient electronic device. Moreover, after receiving an un-share command, the electronic device may temporarily or permanently disable the unique token on the computer system, so that the computer system is unable to access the content in the secure content.

20 Claims, 10 Drawing Sheets

(56) References Cited

U.S. PATENT DOCUMENTS

| | | |
|---|---|---|
| 8,799,658 B1 | 8/2014 | Sellier et al. ................. 713/172 |
| 8,997,213 B2 | 3/2015 | Papakipos et al. ............. 726/19 |
| 9,071,593 B2 | 6/2015 | Vrancken et al. |
| 9,130,922 B2 | 9/2015 | Fushman et al. |
| 9,219,608 B2 | 12/2015 | Lee et al. |
| 9,300,652 B2 | 3/2016 | Sanso et al. |
| 2006/0294192 A1* | 12/2006 | Mao ..................... H04L 63/102 |
| | | 709/213 |
| 2010/0043060 A1 | 2/2010 | Reuzel et al. .................... 726/4 |
| 2013/0174222 A1 | 7/2013 | Ogle et al. ........................ 726/3 |
| 2013/0179679 A1* | 7/2013 | Broustis ................ H04L 9/0822 |
| | | 713/152 |
| 2014/0081932 A1* | 3/2014 | Krislov ............. G06F 17/30011 |
| | | 707/694 |
| 2014/0282882 A1 | 9/2014 | Tsui et al. ......................... 726/4 |
| 2015/0163206 A1 | 6/2015 | McCarthy et al. ........... 713/171 |
| 2016/0105526 A1* | 4/2016 | Kritt ..................... H04L 67/306 |
| | | 709/204 |
| 2016/0259949 A1* | 9/2016 | Stroud ................ G06F 21/6218 |

\* cited by examiner

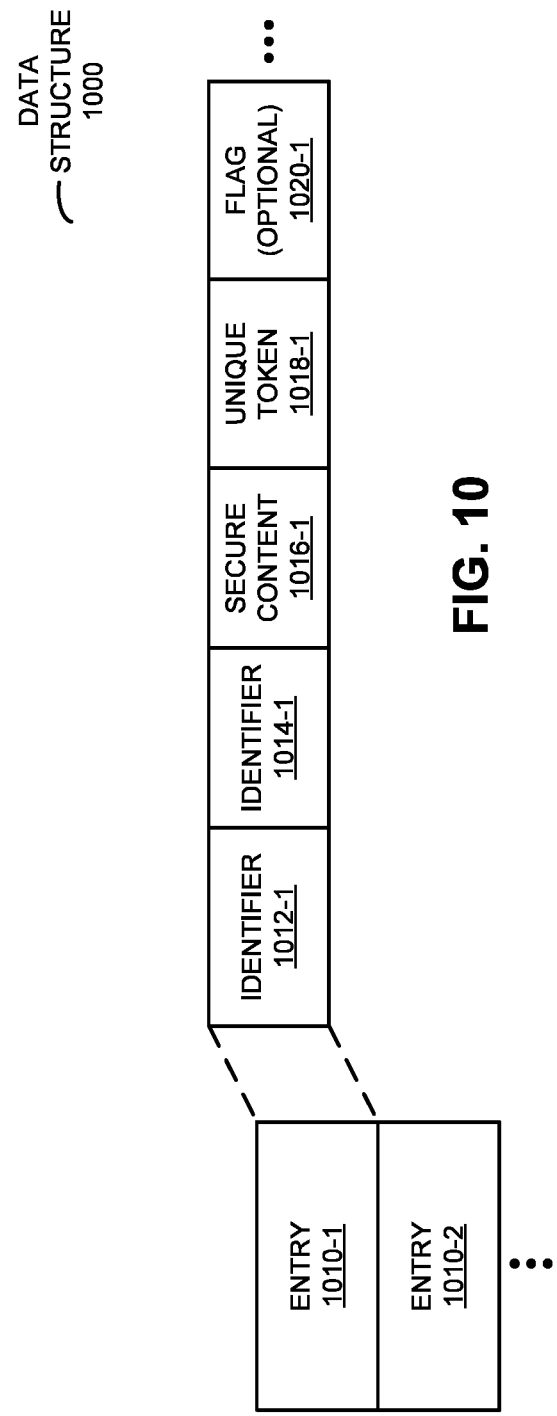

SYSTEM FOR SHARING SELECTIVELY EPHEMERAL CONTENT

CROSS REFERENCE TO RELATED APPLICATIONS

This application claims priority under 35 U.S.C. 119(e) to U.S. Provisional Application Ser. No. 62/262,253, entitled "Collaborative Video Hosting Platform," by Charles Miller, et al., filed on Dec. 2, 2015, to U.S. Provisional Application Ser. No. 62/210,365, entitled "Collaborative Video Hosting Platform," by Charles Miller, et al., filed on Aug. 26, 2015, and to U.S. Provisional Application Ser. No. 62/198,594, entitled "Collaborative Video Hosting Platform," by Charles Miller, et al., filed on Jul. 29, 2015, the contents of each of which are herein incorporated by reference.

FIELD

The described embodiments relate to techniques for sharing content, including sharing long-lived, but selectively ephemeral content based on user inputs.

BACKGROUND

The popularity of the Internet has resulted in an ever-increasing amount of content that is available to individuals. For example, many individuals share content with each other via social networking services or social media. In particular, via social networking services, individuals can build social networks with people who share similar personal interests, career interests, activities, backgrounds and/or real-life connections. Then, an individual can share content, such as ideas, pictures, posts, activities, events, interests and/or video, with people in their social network using a social networking service.

However, there are often challenges associated with existing social networking services. In particular, an individual may have relationships with people who have different backgrounds or interests, and thus who may be members of different, partially overlapping social networks. It can be difficult for an individual to manage the distribution of content to specific people in these social networks.

Moreover, there can be a conflict of interest inherent to social networking services between individual privacy and the use of information about the users of social networking services and their content. Notably, while many social networking services are ostensibly free, user information and content are usually directly or indirectly used to monetize the social networking services. For example, user information and content may be sold to third parties. Alternatively or additionally, user information and content may be used to guide the display of targeted advertisements to the users at the expense of user privacy.

Furthermore, content posted on social networking services is long-lived. Invariably, while many people subsequently regret something that they said or did that is readily available within their social network(s) via a social networking service, it can be difficult for them to delete or erase this information. In addition, even though content may have a finite lifespan, outdated content is often still accessible on social networking services.

In principle, some of these challenges can be addressed by automatically deleting content a short, fixed time after it is posted in a social networking service. However, in practice this approach is inflexible and can be misleading, because it is typically not possible to delete all the copies of the content on the social networking service or on different servers on the Internet.

Consequently, existing social networking services can be frustrating for users, which can degrade the user experience.

SUMMARY

The described embodiments relate to an electronic device that provides long-lived, but selectively ephemeral access to content. This electronic device includes: an interface circuit that communicates with a recipient electronic device and a computer system; an imaging sensor; memory that stores an instance of a program module and the content acquired using the imaging sensor; and a processor that executes the instance of the program module.

In particular, during operation, when the processor executes the instance of the program module, the electronic device may generate secure content based on protection information and the content. Then, the electronic device may provide, to the computer system, the secure content. Moreover, the electronic device may receive a share command to enable the recipient electronic device to view the content, where the recipient electronic device is associated with a recipient in a communication network. Next, the electronic device may communicate, to the computer system, a unique token that is associated with the recipient and an instruction to enable the recipient electronic device to view the content based on the share command, where the unique token allows the computer system to access the content in the secure content so that the computer system has an ability to provide the content to the recipient electronic device. Furthermore, the electronic device may receive an un-share command to disable an ability of the recipient electronic device to view the content. Additionally, the electronic device may disable the unique token on the computer system based on the un-share command, where the disabling of the unique token disables an ability of the computer system to access the content in the secure content, where access to the content in the communication network is long-lived but selectively ephemeral based on the un-share command.

Note that, when the content is selectively shared with another recipient in the communication network, a different unique token that is associated with the other recipient may be communicated to the computer system, which allows the computer system to access the content in the secure content so that the computer system can provide the content to another recipient electronic device that is associated with the other recipient.

Moreover, the content may include multiple images and the secure content may include different secure content for each of the images. When the recipient is allowed to view the images, different unique tokens, which are each associated with a given image, may be communicated to the computer system to allow independent selective control of access to the images in the different secure content.

Furthermore, disabling the unique token may include: changing a value of a flag on the computer system; erasing the unique token on the computer system; and/or changing the unique token on the computer system.

Additionally, the protection information may include an encryption key and the unique token includes a key that facilitates access to the secure content.

In some embodiments, during operation, the electronic device: receives a re-share command to re-enable the ability of the recipient electronic device to view the content; and re-activates the unique token on the computer system based on the re-share command. The re-activating of the unique token may re-enable the recipient electronic device to view the content based on the re-share command. Moreover, the re-activated unique token may allow the computer system to access the content in the secure content so that the computer system once again has the ability to provide the content to the recipient electronic device.

Note that an instance of the program module, the computer system and another instance of the program module on the recipient electronic device may provide a secure end-to-end virtual container for the content in the communication network.

Moreover, the communication network may be associated with a user of the electronic device and one or more recipients, including the recipient.

Other embodiments provide the computer system that performs counterpart operations to at least some of the aforementioned operations performed by the electronic device.

Other embodiments provide a computer-program product (such as an instance of the program module) for use in conjunction with the electronic device or the computer system. This computer-program product includes instructions for at least some of the aforementioned operations performed by the electronic device or the computer system.

Other embodiments provide a method for providing long-lived, but selectively ephemeral access to content. The method includes at least some of the aforementioned operations performed by the electronic device or the computer system.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIG. 10 is a drawing illustrating an example of a data structure that is used by the electronic device in FIG. 9 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
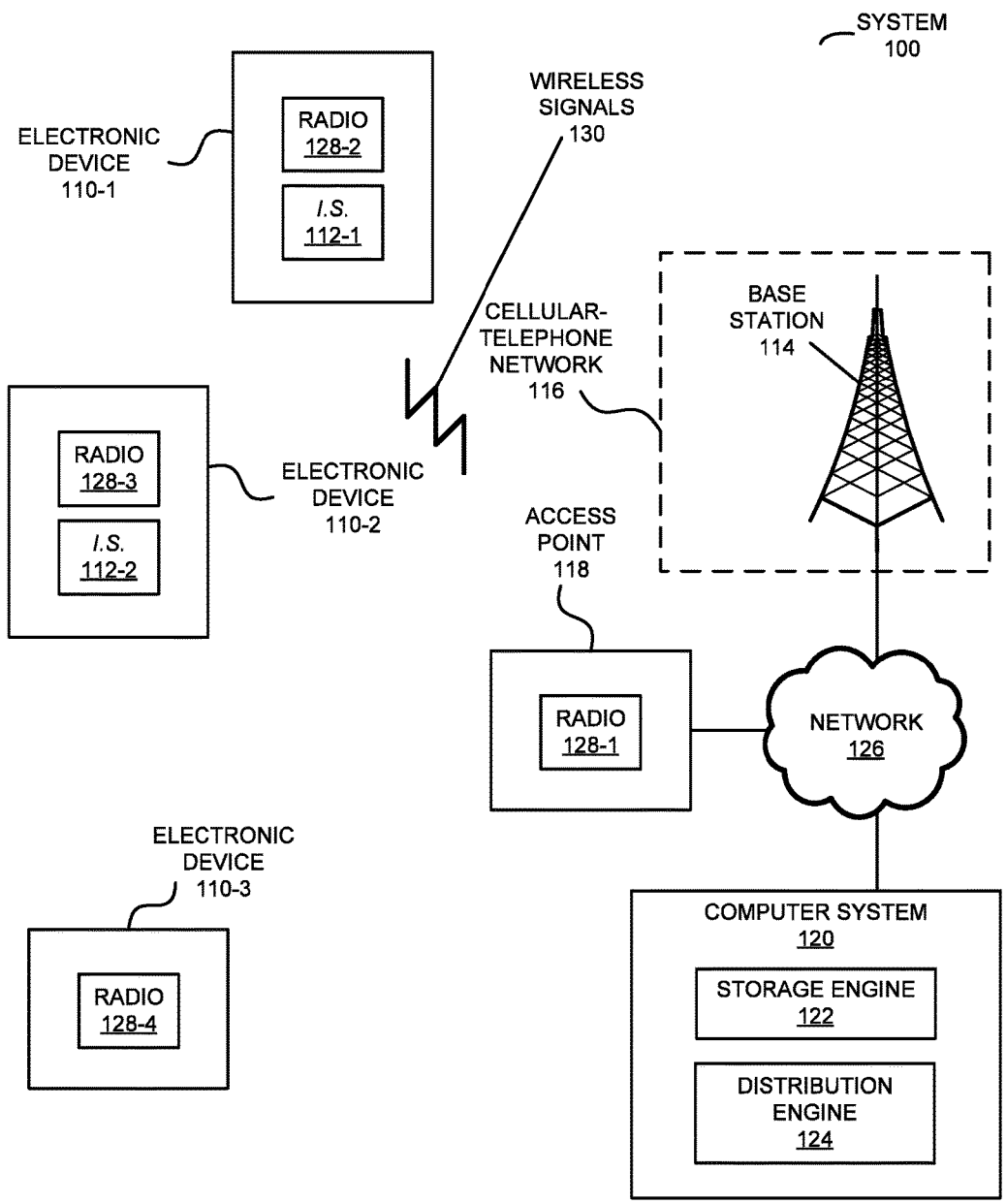
FIG. 1 is a block diagram illustrating electronic devices communicating in accordance with an embodiment of the present disclosure.

In order to provide long-lived, but selectively ephemeral access to content, an electronic device may provide secure content, which was generated based on protection information and the content, to a computer system. Then, after receiving a share command, the electronic device may communicate, to the computer system, a unique token that is associated with a recipient in a communication network and an instruction to enable a recipient electronic device associated with the recipient to view or access the content. This unique token may allow the computer system to access the content in the secure content, so that the computer system has an ability to provide the content to the recipient electronic device. Moreover, after receiving an un-share command, the electronic device may temporarily or permanently disable the unique token on the computer system, so that the computer system is unable to access the content in the secure content.

By allowing an individual (or an organization) in the communication network to selectively share and then un-share the content, this communication technique may facilitate improved control over the content. For example, an individual may flexibly determine who has access to the content and when they are able to access it. In the process, the communication technique may enhance user privacy. Moreover, the ability to control the distribution and access to the content on an individual basis may facilitate improved and efficient organization and management of the content in the communication network. In particular, the communication technique may facilitate dynamic management of content access, including retroactively. In this way, the communication technique may allow an individual to control access to the content as a function of time (which may allow access to stale or out-of-date content to be removed) and/or as their relationships with other people in the communication network change. Furthermore, the communication technique may allow an individual to selectively share and/or un-share the content with groups of recipients. Consequently, the communication technique may reduce user frustration when using the communication network, and thus may improve the overall user experience.

In the discussion that follows, an individual or a user may be a person. Also, or instead, the communication technique may be used by any type of organization, such as a business, which should be understood to include for-profit corporations, non-profit corporations, groups (or cohorts) of individuals, sole proprietorships, government agencies, partnerships, etc.

Moreover, in the discussion that follows the communication network is illustrated in the context of a social networking service, i.e., the individual and the recipients may constitute a social network (such as a personal or a professional social network). However, in other embodiments, the communication technique may be used to disseminate and control selective access to content in a wide variety of applications or systems, including news, media, online forums and entertainment applications. Moreover, the communication technique may be used in applications where the communication or interactions among different entities (such as people, organizations, etc.) can be described by a social graph (in which the nodes are people and the branches represent associations or interrelationships). Note that the people may be loosely affiliated with a website (such as viewers or users of the website), and thus may include people who are not formally associated (as opposed to the users of a social networking service who have user accounts). Thus, the connections or relationships between the individual and the recipients may be defined less stringently than by explicit acceptance of requests by individuals to associate or establish connections with each other, such as people who have previously communicated with each other (or not) using a communication protocol, or people who have previously viewed each other's home pages (or not), etc. In this way, the communication technique may be used to expand the quality of interactions and value-added services among relevant or potentially interested people in a more loosely defined group of people.

Furthermore, in the discussion that follows, electronic devices may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth™ (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, a cellular-telephone communication protocol and Wi-Fi are used as illustrative examples.

Communication among electronic devices is shown in FIG. 1, which presents a block diagram illustrating a system 100 that allows users to distribute or provide access to long-lived, but selectively ephemeral content. In particular, system 100 includes one or more electronic devices 110 (such as portable electronic devices, e.g., cellular telephones) at least some of which may include instances of optional imaging sensors (I.S.) 112 (such as a CMOS image sensor, a CCD, a camera, etc.), optional base station 114 in cellular-telephone network 116, optional access point 118 and/or a computer system 120 (such as a server), which are sometimes collectively referred to as 'components' in system 100. Moreover, computer system 120 may include: a storage engine (or module) 122, and a distribution engine (or module) 124.

Note that components in system 100 may communicate with each other via cellular-telephone network 116 and/or a network 126 (such as the Internet and/or a wireless local area network or WLAN). For example, as described further below, the communication may convey content (such as an image, video, music, and/or text) and/or instructions associated with sharing or un-sharing of the content. Thus, the communication in system 100 may be wired and/or wireless.

In embodiments where the communication involves wireless communication via a WLAN, the wireless communication includes: transmitting advertising frames on wireless channels, detecting another component in system 100 by scanning wireless channels, establishing connections (for example, by transmitting association requests, data/management frames, etc.), optionally configuring security options (e.g., Internet Protocol Security), and/or transmitting and receiving packets or frames via the connection (which may include information that specifies content, instructions, etc.). Moreover, in embodiments where the communication involves wireless communication via cellular-telephone network 116, the wireless communication includes: establishing connections, and/or transmitting and receiving packets (which may include information that specifies the content, the instructions, etc.).

Figure 9:
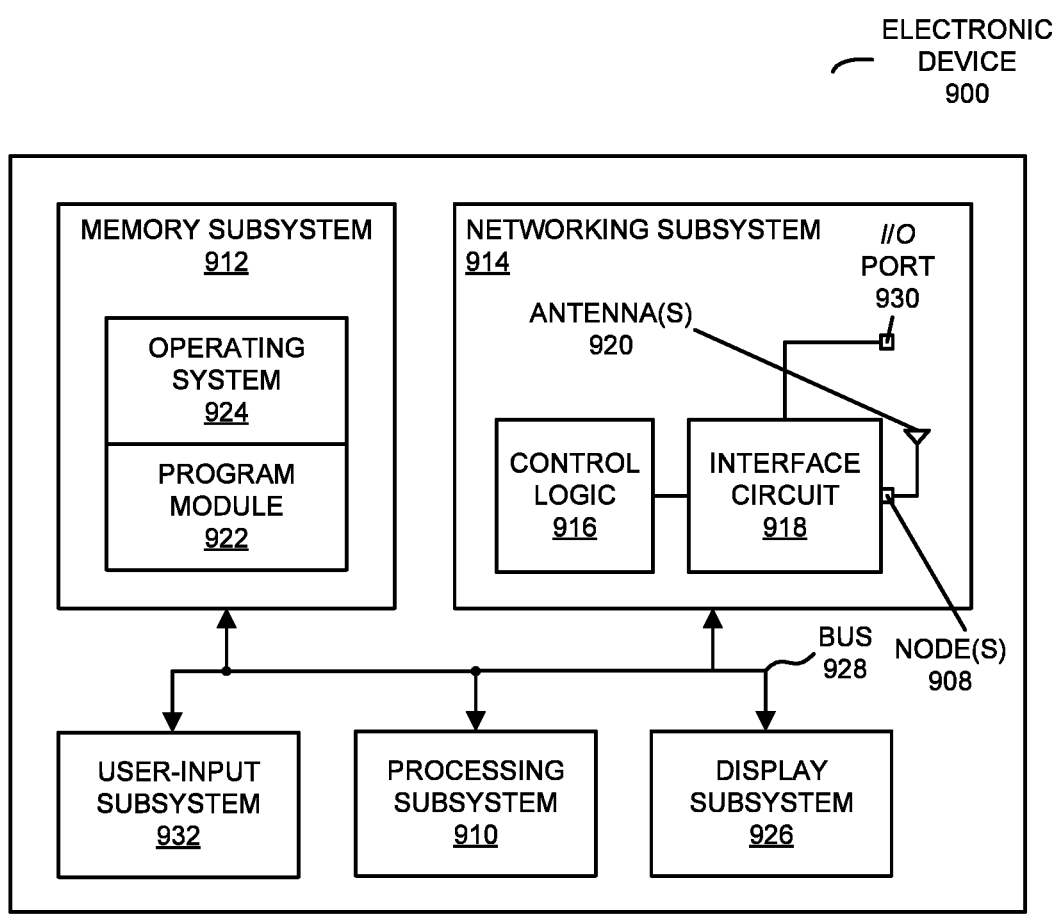
FIG. 9 is a block diagram illustrating an example of one of the electronic devices of FIG. 1 in accordance with an embodiment of the present disclosure.

As described further below with reference to FIG. 9, electronic devices 110, optional base station 114, optional access point 118 and/or computer system 120 may include subsystems, such as a networking subsystem, a memory subsystem and a processor subsystem. In addition, electronic devices 110, optional base station 114, optional access point 118 and/or computer system 120 may include radios 128 in the networking subsystems. More generally, the components can include (or can be included within) any electronic devices with the networking subsystems that enable these components to communicate with each other.

Moreover, as can be seen in FIG. 1, wireless signals 130 (represented by jagged lines) are transmitted by radios 128 in the components. For example, radio 128-1 in optional access point 118 may transmit information (such as frames or packets) using wireless signals 130. These wireless signals may be received by radios 128 in one or more of the other components, such as by electronic device 110-1. This may allow computer system 120 to communicate information to electronic device 110-1.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame (such as the content, the instructions, etc.).

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Electronic devices 110 may perform at least some of the operations in the communication technique by executing instances of a software application (which is sometimes referred to as 'software' or a 'program module'). This software application may be a standalone application or a portion of another application that is resident on and that executes on electronic devices 110, such as a software application that is provided by computer system 120 or that is installed on and that executes on electronic devices 110.

As described further below with reference to FIGS. 2 and 3, during the communication technique a user of one of electronic devices 110 (such as electronic device 110-1) may acquire content, such as an image, video (with multiple images), audio and/or text. For example, the user may capture a video using optional imaging sensor 112-1. Then, electronic device 110-1 may generate, based on the content and protection information (such as a symmetric or an asymmetric encryption key, a secure or cryptographic hashing function, etc.), secure content. Next, electronic device 110-1 may provide, via cellular-telephone network 116 and/or network 126, the secure content to computer system 120, and storage engine 122 may store the secure content in local or distributed memory in or associated with computer system 120.

Moreover, the user may provide a user input, such as a share command, to electronic device 110-1. For example, the use may activate a virtual icon in a user interface displayed on a touch-sensitive display in or associated with electronic device 110-1, such as by contacting a surface of the touch-sensitive display with a strike area associated with the virtual icon and/or by applying a pressure or a force exceeding a threshold value to the surface of the touch-sensitive display. Alternatively or additionally, the user may activate a physical button, a scroll wheel, a switch, a keyboard, a mouse, a touch pad, another human-interface device, a wireless-ranging device (which may use time-of-flight measurements to detect a gesture or a change in the user's distance from electronic device 110-1), etc. in or associated with electronic device 110-1. Furthermore, the user may verbally provide commands, which are then identified using a voice-recognition technique. Thus, the user input may be haptic, a body movement or gesture, a sound or spoken command, etc.

In response to the share command, electronic device 110-1 may provide an instruction (including a unique token that is associated with one or more recipients and that includes a key that facilitates access to the secure content) to computer system 120 via cellular-telephone network 116 and/or network 126. Furthermore, based on the instruction, distribution engine 124 in computer system 120 may provide the content to one or more of electronic devices 110 (such as electronic device 110-2) that are associated with the one or more recipients. In particular, as described further below with reference to FIG. 4, distribution engine 124 may present an indication or an option corresponding to the content (such as a selectable icon) in a user interface displayed on electronic device 110-2. If another user of electronic device 110-2 selects or activates this icon, computer system 120 may, via cellular-telephone network 116 and/or network 126, stream the content to electronic device 110-2 for display or presentation to the other user. (More generally, the other user may be able to access the content on computer system 120 from electronic device 110-2.) Note that an instance of the program module on electronic device 110-1, computer system 120 and another instance of the program module on electronic device 110-2 (the recipient electronic device) may provide a secure end-to-end virtual container (or virtual environment) for the content.

Subsequently, in response to the user providing another user input to electronic device 110-1 (such as an un-share command), electronic device 110-1 may provide, via cellular-telephone network 116 and/or network 126, am instruction for disabling the unique token on computer system 120, so that the one or more recipients are no longer able to access or view the content. In particular, computer system 120 may: change a value of a flag associated with the unique token on computer system 120; erase the unique token on computer system 120; and/or change the unique token on computer system 120. Afterwards, computer system 120 may no longer be able to access the secure content, so that computer system 120 cannot stream the content to electronic device 110-2.

Furthermore, if the user provides another share command to electronic device 110-1, electronic device 110-1 may provide an additional instruction (including another unique token that is associated with one or more other recipients and that includes the key that facilitates access to the secure content) to computer system 120 via cellular-telephone network 116 and/or network 126. Note that the unique tokens are specific to a particular recipient (or a group of recipients), so that the user has control over access to the content on an individual basis. Thus, unless the recipients are in a common group or recipients, in general different recipients may have or may be associated with different tokens. Then, based on the additional instruction, distribution engine 124 in computer system 120 may provide the content to one or more of electronic devices 110 (such as electronic device 110-3) that are associated with the one or more other recipients.

In these ways, the communication technique may allow the user of electronic device 110-1 to control the access to the content on an individual basis in a communication network or a social network that includes an individual or a user of electronic device 110-1, as well as the one or more recipients and/or the one or more other recipients. This includes the ability to share access or the ability to view the content, as well as the ability to subsequently revoke or disable the access to the content. However, the content remains in system 100, so the user can subsequently re-enable or re-active the unique token (without uploading the secure content again), so computer system 120 is able to provide the content by the same recipients (such as a recipient associated with electronic device 110-2) and/or the user may choose to share access to the content with one or more other recipients. Thus, the communication technique may efficiently allow viewing of or access to the content to be enabled or disabled on an individual basis. Furthermore, the content in system 100 may be long-lived, but selectively ephemeral based on the user's instructions.

In some embodiments, electronic devices 110 (or the instances of the software application) have features or perform operations during the communication technique that enhance the users' ability to acquire or to edit the content. For example, as described further below with reference to FIG. 5, the software application may allow the user to smooth image transitions when switching from a front-facing camera to a back-facing camera (or vice versa) in one of electronic devices 110. In particular, electronic device 110-1 may blend concurrent (i.e., acquired at least in part at the same time) images from the front-facing camera and the back-facing camera.

Figure 6:
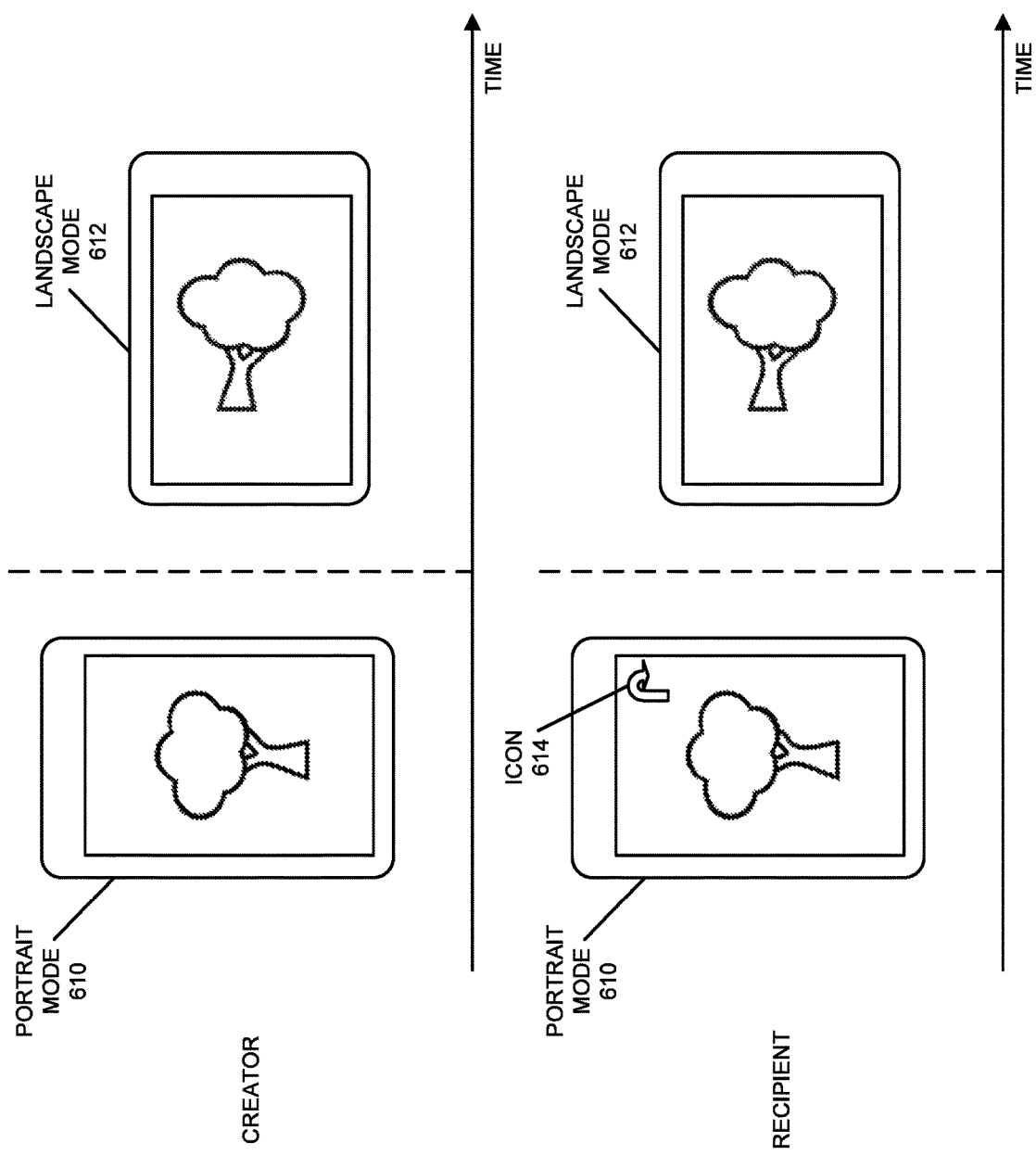
FIG. 6 is a drawing illustrating an example of the use of an electronic device in FIG. 1 to acquire content in accordance with an embodiment of the present disclosure.

Moreover, as described further below with reference to FIG. 6, the software application may allow the user to lock the camera orientation, such that the perspective in the acquired video remains in upright (portrait mode) or sideways (landscape mode) even if the user rotates or changes the orientation of one of electronic devices 110 (which is sometimes referred to as a 'source electronic device') relative, e.g., to the ground. This feature may help ensure that the video remains aligned during playback on a recipient electronic device, and thus may help ensure that the video resolution is maintained during playback without reducing the aspect ratio of the images. In order to assist the recipient in following the twists and turns of the source electronic device that acquired the video, the software application executing on the recipient electronic device may provide feedback as to how to rotate or change the orientation of the recipient electronic device to follow the changes in the orientation of the source electronic device when the video was acquired. For example, the software application executing on the recipient electronic device may display visual cues, such as an indication or an icon on a display, that instructs the recipient as to how to rotate or change the orientation of the recipient electronic device to follow the changes in the orientation of the source electronic device.

Figure 7:
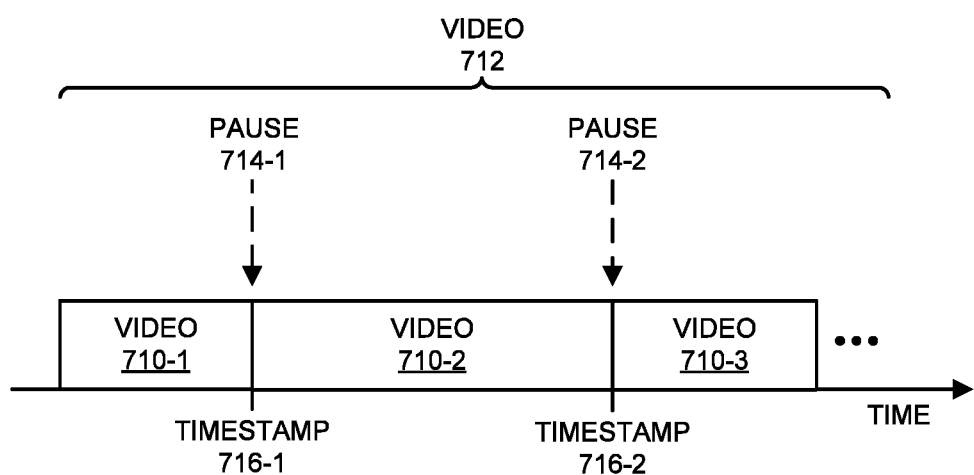
FIG. 7 is a drawing illustrating an example of the use of an electronic device in FIG. 1 to acquire content in accordance with an embodiment of the present disclosure.

Furthermore, as described further below with reference to FIG. 7, the software application may allow the user to suspend or pause recording, and may remain in this state until the recording is completed or cancelled. This feature may allow the user to create an aggregated video over an extended period of time (i.e., to create a longitudinal timeline video).

Figure 8:
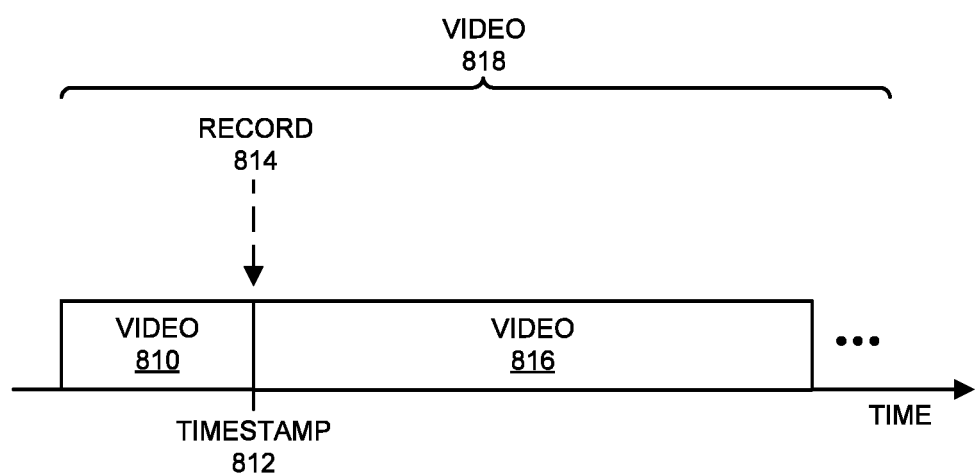
FIG. 8 is a drawing illustrating an example of the use of an electronic device in FIG. 1 to modify content in accordance with an embodiment of the present disclosure.

Additionally, as described further below with reference to FIG. 8, the software application may allow the user to edit a video while recording it (which is sometimes referred to as 'live editing while recording'). In particular, prior to completing a video recording, the user can jump or rewind through the video to an earlier timestamp in the video and then to edit the video at that point. For example, the user may move to a particular timestamp in the video, and then the user may record new content starting at this point. In this way, the user can append new recording content to the video at an arbitrary timestamp or temporal location in the video.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
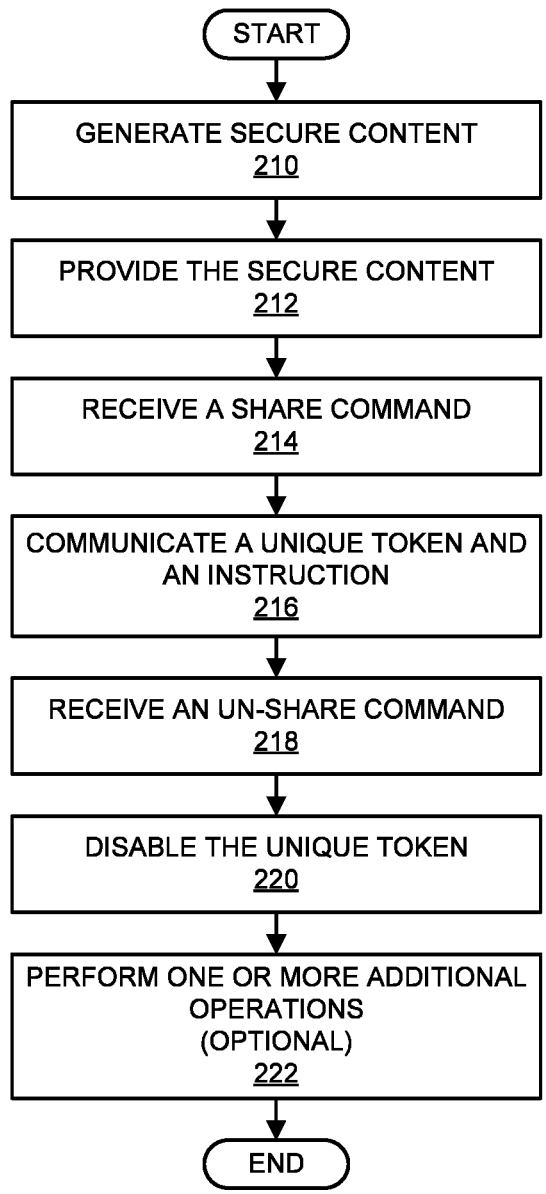
FIG. 2 is a flow diagram illustrating an example of method for providing long-lived, but selectively ephemeral access to content in FIG. 1 in accordance with an embodiment of the present disclosure.

FIG. 2 presents embodiments of a flow diagram illustrating an example of a method 200 for providing access to long-lived, but selectively ephemeral content, which may be performed by an electronic device (such as electronic device 110-1 in FIG. 1). During operation, the electronic device may generate secure content (operation 210) based on protection information and the content. For example, the protection information may include an encryption key and/or a secure or cryptographic hashing function. Then, the electronic device may provide, to a computer system, the secure content (operation 212).

Moreover, the electronic device may receive a share command (operation 214) to enable the recipient electronic device to view or access the content, where the recipient electronic device is associated with a recipient in a communication network. Next, the electronic device may communicate, to the computer system, a unique token that is associated with the recipient and an instruction (operation 216) to enable the recipient electronic device to view or access the content based on the share command, where the unique token allows the computer system to access the content in the secure content so that the computer system has an ability to provide the content to the recipient electronic device. Thus, in the communication technique the same unique token may be associated with at least the recipient (or a group of recipients) and the content (or a portion of the content, such as an image in a set of multiple images). For example, the unique token may include a key that facilitates access to the secure content. More generally, the unique token may include an identifier of at least the recipient, an optional identifier of a group of recipients, security credentials (such as the key), optional user privileges associated with the content, and/or optional information specifying or identifying the instance or version of the software application or program module. Thus, in some embodiments, the unique token is an access token that can unlock specific secure content.

Note that, when the content is selectively shared with another recipient in the communication network, a different unique token that is associated with the other recipient may be communicated to the computer system, which allows the computer system to access the content in the secure content so that the computer system can provide the content to another recipient electronic device that is associated with the other recipient. Moreover, the content may include multiple images and the secure content may include different secure content for each of the images. When the recipient is allowed to view or access the images, different unique tokens, which are each associated with a given image, may be communicated to the computer system to allow independent selective control of access to the images in the different secure content.

Furthermore, the electronic device may receive an un-share command (operation 218) to disable an ability of the recipient electronic device to view or access the content. Additionally, the electronic device may disable the unique token (operation 220) on the computer system based on the un-share command, where the disabling of the unique token disables an ability of the computer system to access the content in the secure content, where access to the content in the communication network is long-lived but selectively ephemeral based on the un-share command. For example, disabling the unique token may include: changing a value of a flag on the computer system; erasing the unique token on the computer system; and/or changing the unique token on the computer system.

In some embodiments, the electronic device optionally performs one or more additional operations (operation 222). For example, the electronic device may: receive a re-share command to re-enable the ability of the recipient electronic device to view or access the content; and re-activate the unique token on the computer system based on the re-share command. The re-activating of the unique token may re-enable the recipient electronic device to view or access the content based on the re-share command. Moreover, the re-activated unique token may allow the computer system to access the content in the secure content so that the computer system once again has the ability to provide the content to the recipient electronic device.

In some embodiments of method 200 there are additional or fewer operations. Moreover, the order of the operations may be changed, and/or two or more operations may be combined into a single operation. For example, instead of associating a unique token with an individual, the unique token may be associated with a group of recipients, who are treated the same as if they were a single person. This approach may significantly improve efficiency (a user can share content with the group of recipients using one share command, instead of separate share commands for each member of the group of recipients). In addition, an administrator that manages the distribution of the content may not be required. Instead, members of a group (including old members and/or new members) may share a common unique token (which is sometimes referred to as a 'group-share token'). Thus, the user can share content with people that have a common interest (such as a musician) or goal (such as a project at a company) based on a membership list for a group. Subsequently, if the user de-activates the group-share token, the entire group may lose the ability to view or access the associated content. Similarly, if a person leaves a group or a company (i.e., removes their social presence from the group membership), they may lose access to all of an individual's content that was shared with this group.

Figure 3:
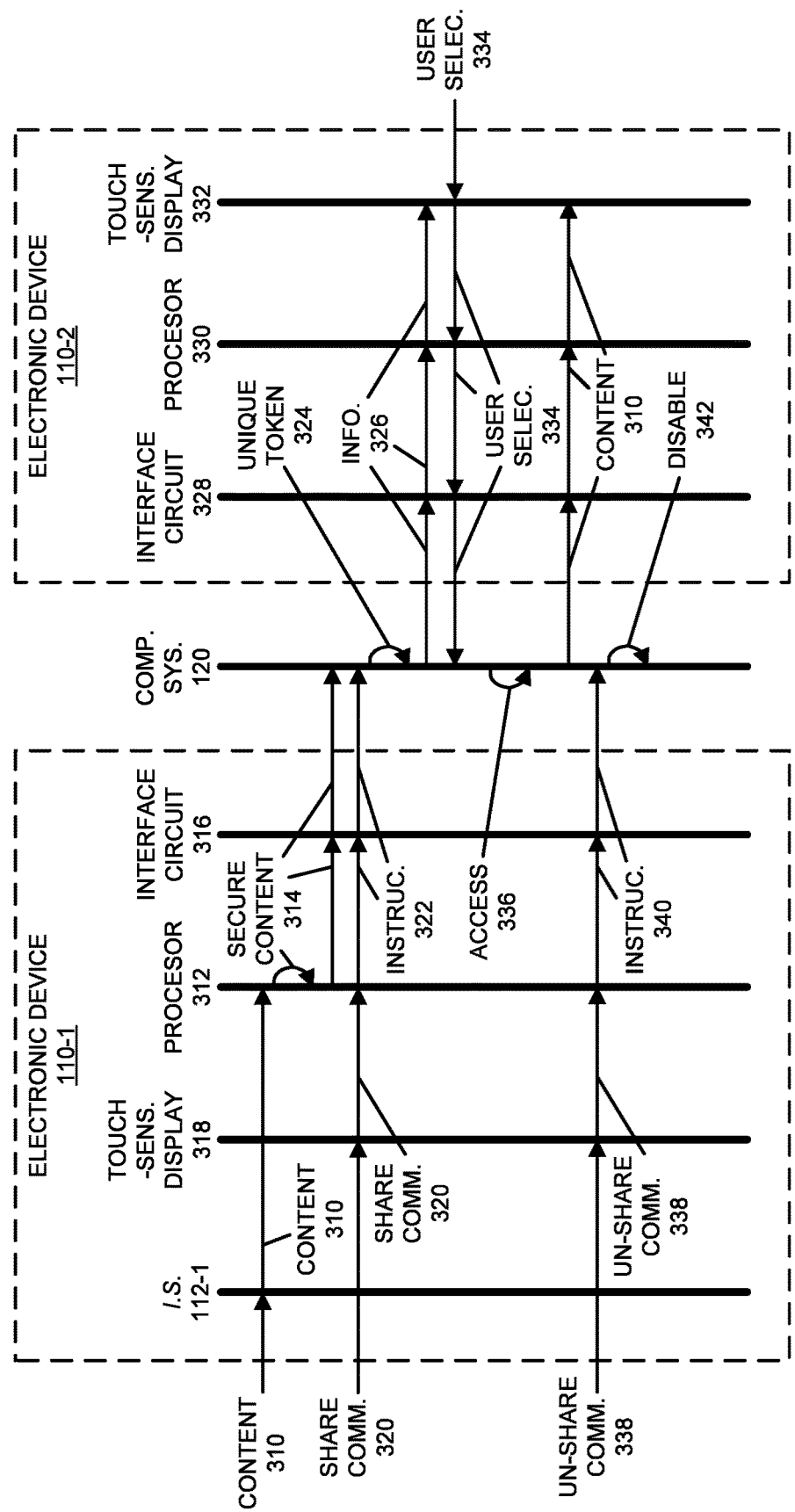
FIG. 3 is a drawing illustrating an example of communication among the electronic devices in FIG. 1 in accordance with an embodiment of the present disclosure.

Embodiments of the communication technique are further illustrated in FIG. 3, which presents a drawing illustrating an example of communication among electronic devices 110, and computer system 120 (FIG. 1). In particular, during the communication technique, a user of electronic device 110-1 may acquire content 310. For example, content 310 may be acquired using imaging sensor 112-1, such as a video recording. However, in other embodiments, content 310 is preexisting or was received from another electronic device.

Then, processor 312 may generate secure content 314 based on content 310 and protection information, and may provide secure content 314 to interface circuit 316. For example, processor 312 may encrypt content 310 or may apply a secure hashing function to content 310. Next, interface circuit 316 may provide secure content 314 to computer system 120 via cellular-telephone network 116 and/or network 126 (FIG. 1).

Moreover, the user may provide share command 320 (or information specifying share command 320) that identifies a recipient to a touch-sensitive display 318 (e.g., by activating a virtual icon in a user interface), which may provide share command 320 to processor 312. In response, processor 312 may provide instruction 322 (including a unique token 324 that is associated with one or more recipients and that includes a key that facilitates access to the secure content 314) to interface circuit 316, which then provides instruction 322 to computer system 120 via cellular-telephone network 116 and/or network 126 (FIG. 1).

Furthermore, based on instruction 322, computer system 120 may provide content 310 to electronic device 110-2, which is associated with the recipient. For example, computer system 120 may information 326 electronic device 110-2 that content 310 is available. In response to receiving information 326, interface circuit 328 in electronic device 110-2 may provide information 326 to processor 330, which displays information 326 on a touch-sensitive display 332 (e.g., in a user interface). Next, if a user of electronic device 110-2 provides a user selection 334 of content 110 (e.g., by activating a virtual icon in a user interface), this user selection (or information specifying the user selection) may be communicated to computer system 120 by processor 330 and interface circuit 328 via cellular-telephone network 116 and/or network 126 (FIG. 1).

In response to user selection 334, computer system 120 may access 336 content 310 in secure content 314 using unique token 324, and may stream content 310 to electronic device 110-2 via cellular-telephone network 116 and/or network 126 (FIG. 1). The streamed content 310 may be provided by interface circuit 328 to processor 330, which then displays content 310 on touch-sensitive display 332.

Subsequently, the user of electronic device 110-1 may provide un-share command 338 (or information specifying un-share command 338) that identifies the recipient to a touch-sensitive display 318 (e.g., by activating another virtual icon in the user interface), which may provide un-share command 338 to processor 312. In response, processor 312 may provide instruction 340 for disabling unique token 324 to interface circuit 316, which then provides instruction 340 to computer system 120 via cellular-telephone network 116 and/or network 126 (FIG. 1). In response, to instruction 340, computer system 120 may disable 342 unique token 324, such as by: changing a value of a flag associated with unique token 324 on computer system 120; erasing unique token 324 on computer system 120; and/or changing unique token 324 on computer system 120. Afterwards, computer system 120 may no longer be able to access secure content 314, so that computer system 120 cannot stream content 310 to electronic device 110-2.

Representative Embodiments

We now further describe embodiments of the communication technique. This communication technique may be implemented via a collaborative video hosting platform. As described previously, the collaborative video hosting platform may provide user control over access to user content in the collaborative video hosting platform. In particular, a user of a cellular telephone (and, more generally, an electronic device) may acquire a video. (Note that this user is sometimes referred to as a 'creator.') The software application executing on the user's cellular telephone may automatically and immediately send this video recording to one or more servers in the collaborative video hosting platform. Subsequently, if the user decides to share this video with another user of the software application, they may provide permission to view that video, e.g., via a background link and authorization that allow a second user or recipient to view the video. Note that the video is not downloaded by the second user, but can be viewed on their cellular telephone (and, more generally, their electronic device) using the software application that is executing on the cellular telephone, and that displays the video from the one or more servers in the collaborative video hosting platform on the second user's cellular telephone.

At any point, the creator of the video can change their permission for this video, either by sharing that video with additional users or by removing previously granted viewing permissions. This user control is sometimes referred to as a 'leash,' because it allows a user to change their mind regarding who can view their videos, not just at the moment of creation, but at any time in the future. Moreover, because shared videos are not downloaded onto the recipient electronic devices, the leash has integrity (unless the recipient has captured the content, which is not a capability that is directly supported by the software application or the collaborative video hosting platform).

Figure 4:
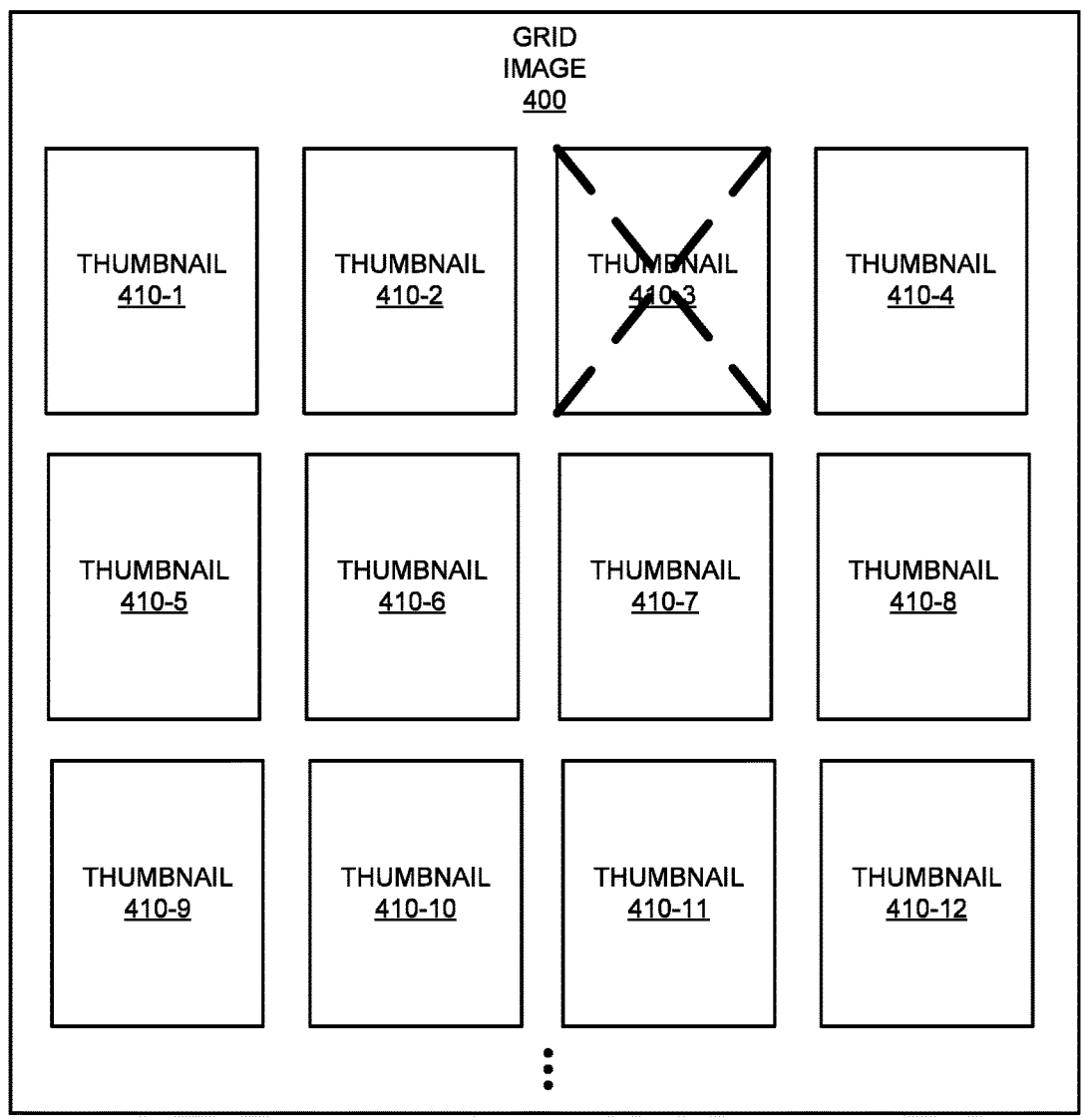
FIG. 4 is a drawing illustrating an example of a grid image for organizing content in accordance with an embodiment of the present disclosure.

As shown in FIG. 4, which presents a drawing illustrating a grid image 400 for organizing content, after the creator has provided permission for a recipient to view a video, the recipient may be alerted to the option to view the video using thumbnails 410 that are included in grid image 400 and that are displayed on their cellular telephone. Note that grid image 400 may organize the available content and may allow the recipient to selectively view enabled videos. For example, using the software application executing on their cellular telephone, the recipient can sort grid image 400 by date, creator, likes, or tag, and/or metadata searching. Moreover, thumbnails 410 may become the primary way a user sorts, searches and (re)watches videos by recognizing the video through its unique thumbnail (as opposed to a common profile picture of the sender).

In some embodiments, the computer system that implements the communication technique may dynamic anticipate content to include in grid image 400 based on a user's context, such as information in their user profile, previous viewing history, and/or their association with a group (or team) and/or a company. This approach may allow relevant selectable or available content to be displayed to the user and then to be dynamically updated as the context changes.

Note that thumbnails 410 in grid image 400 may be taken or generated when the videos were created. For example, a thumbnail may be: a profile picture, a key frame from a video, a separate photo taken upon completion of the video, an illustration or symbol selected from a library of options, and/or a symbol (such as that illustrated in thumbnail 410-3) inserted into grid image 400 when a recipient access to a video that was previously shared with the recipient has been revoked or disabled to the creator. These options may assist the recipient in sorting, searching, and watching videos covering specific topics or events.

In some embodiments, grid image 400 includes several banners with various colors to indicated which videos are connected to each other through replies, i.e., the sender or creator sees which unseen videos in their friends' grid images are connected to which of the video(s) that the creator previously shared with these individuals. Then, when the creator presses and holds on a thumbnail associated with a connected video, an indicator may be displayed directly linking this video to its counterpart.

As noted previously, while a user is recording a video, the software application may transcode, compress and upload the content to one or more servers in the collaborative video hosting platform. Moreover, when the user finishes recording the video, the collaborative video hosting platform (via the software application) may start playing back the video to them. This approach may allow the user to confirm that the video is acceptable and ready to be shared. Furthermore, while the beginning of a video is being downloaded from the one or more servers for the user's review, the end of this or another video may still be uploading. The net effect of our process may be to provide the users a real-time experience equivalent to recording content to their cellular telephones, while keeping the content solely on the servers in the collaborative video hosting platform, thereby enabling the leash, minimizing the consumption of resources on the cellular telephones (which may reduce power consumption of the cellular telephones), and ensuring that a user has access to their content regardless of which cellular telephone that they are using.

Additional embodiments

Figure 5:
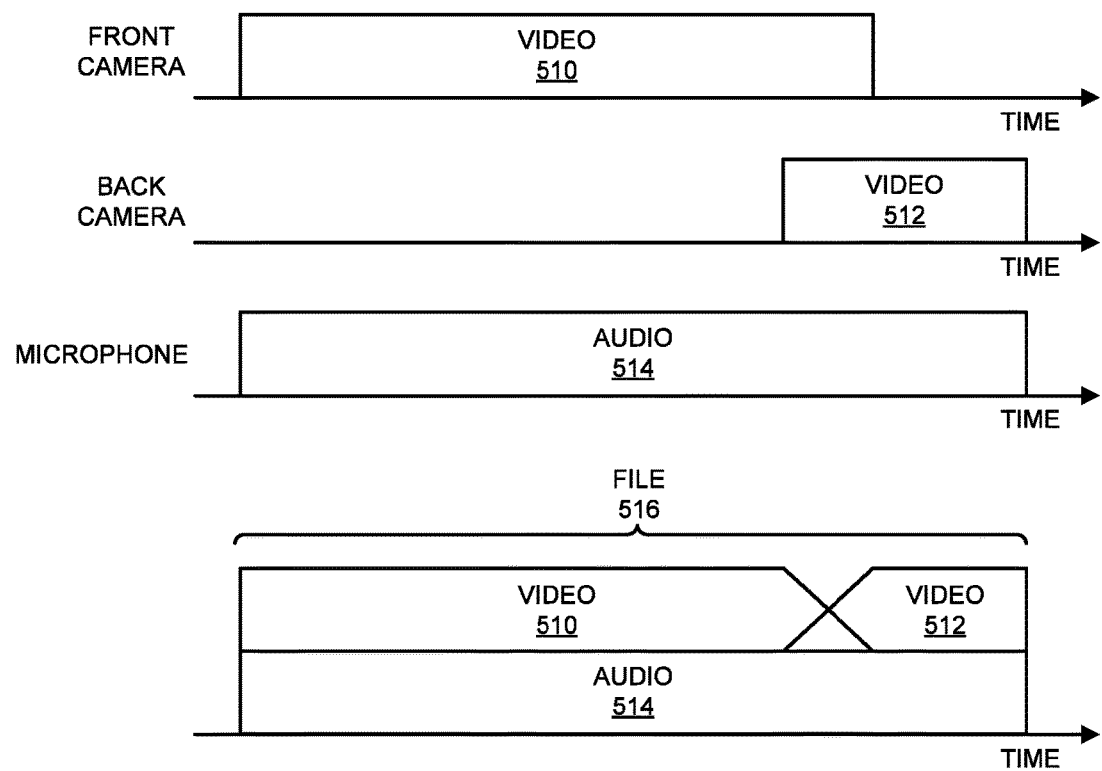
FIG. 5 is a drawing illustrating an example of the use of an electronic device in FIG. 1 to acquire content in accordance with an embodiment of the present disclosure.

We now describe additional embodiments. As described previously, the software application may provide smooth image transitions when switching from a front-facing camera to a back-facing camera (or vice versa) while recording video. In particular, concurrent (i.e., acquired at least in part at the same time) images from the front-facing camera and the back-facing camera may be blended while optionally maintaining or continuing audio recording. Thus, video from the cameras may be, respectively, faded in and out, while continuously recording audio. This is shown in FIG. 5, which presents a drawing illustrating an example of the use of an electronic device in FIG. 1 to acquire content.

This approach is different from those used in many existing electronic devices when the camera is switched or flipped. In particular, in existing approaches there is typically a period or a time interval with a blank image (such as for 0.4 s). In contrast, in order to avoid losing the flow and context of whatever is being captured, the software application may control the camera and the microphone separately during a video capture process. When a camera flip occurs, the preceding video segment 510 may be saved, and then a new video segment 512 may be recorded once the other (opposite) camera is ready. During the transition or switch, the cellular telephone may continue to record audio 514. At the end of the recording process, the software application may stitch together the different video segments 510 and 512 from the cameras and align them with the audio 514 into one file 516 that is uploaded and transcoded. This approach may allow a user to string together content from various perspectives while maintaining a consistent, uninterrupted audio experience, therein making the split perspectives an effective way to communicate complex ideas as a cohesive whole (instead of disparate segments of video separated by a blank image).

Moreover, the software application may allow a user to lock the camera orientation, such that the perspective in the acquired video remains in upright (portrait mode) or sideways (landscape mode) even if the user rotates or changes the orientation of their cellular telephone relative, e.g., to the ground. This is shown in FIG. 6, which presents a drawing illustrating an example of the use of an electronic device in FIG. 1 to acquire content while orientation 610 changes.

This feature may help ensure that the video remains aligned during playback on a recipient electronic device, and thus may help ensure that the video resolution is maintained during playback without reducing the aspect ratio of the images. In particular, many cellular telephones include embedded accelerometers and/or gyroscopes that provide information about the orientation of these electronic devices. During video recording, this information is often used to dynamically adapt or change from portrait mode 610 to landscape mode 612. However, in video production changing the mode during recording can result in a video that is misaligned with an orientation of the recipient (viewing) electronic device. Consequently, on playback the video may be compressed or may have a reduced size. For example, a reduced size version of the video may be displayed as a letterbox video (with black strips above and below or side by side to the original video). Many existing video application address this challenge by recording video with a square aspect ratio, so that the video resolution is preserved regardless of the orientation of the recipient (viewing) electronic device. However, this approach often significantly reduces the resolution of the video.

In contrast, the software application may lock the orientation of the camera during recording, so that the perspective does not change during recording even if the orientation of the cellular telephone is varied. In this way, the full video may be recorded and shared, which allows the video creator to twist and turn the camera as they please. For example, a mechanic can move a camera around a machine to show a fault. The recipient of the video can then simply rotate their cellular telephone in concert with the creator to keep the orientation of the displayed image synchronized with that of the creator's cellular telephone.

In order to assist the recipient in following the twists and turns of the source electronic device that acquired the video, the software application executing on the recipient electronic device may provide sensory feedback (such as visual, acoustic or haptic feedback) as to how to rotate or change the orientation of the recipient electronic device to follow the changes in the orientation of the source electronic device when the video was acquired. For example, the software application executing on the recipient electronic device may display visual cues, such as an indication, text or an icon 614 on a display, that instructs the recipient as to how to rotate or change the orientation of the recipient electronic device to follow the changes in the orientation of the source electronic device.

Note that, while recording video, the software application may acknowledge the measurements from an accelerometer and/or a gyroscope, but may not change the orientation of the video being recorded. Alternatively or additionally, the software application may: reduce the aspect ratio of recorded video to 4:3 (versus the native 16:9); reduce the resolution of the video while recording; and/or may reduce the resolution of the video during playback when the recipient electronic device determines that it is playing back video that was acquired in a horizontal or landscape mode while the recipient electronic device has a vertical or portrait mode. These alternative approaches may result in lower resolution videos and awkward viewing when the recipient wants to fill the screen with the video content but their cellular telephone does not allow this because it determines that there is difference between the source and the viewing orientations.

Furthermore, the software application may allow a user to suspend or pause recording, and may remain in this state until the recording is completed or cancelled. This feature is shown in FIG. 7, which presents a drawing illustrating an example of the use of an electronic device in FIG. 1 to acquire content. In particular, video 710-1 may be buffered and may be augmented with additional video 710-2 and 710-3 until a user provides an indication that the recording session is completed or cancelled (such as by activating a physical button or a virtual icon in a user interface). This feature may allow the user to create an aggregated video 712 over an extended period of time (i.e., to create a longitudinal timeline video, thereby covering an extending time interval, different locations and/or different topics) with one or more pauses 714 in recording at different timestamps 716. Note that in some embodiments the buffered video is persistently stored on the cellular telephone or electron device and/or on the one or more servers in the collaborative video hosting platform. Consequently, the video may be available after shutting down and restarting of the software application.

Additionally, the software application may allow the user to edit a video while recording it. In particular, prior to completing a video recording, the user can jump or rewind through the video to an earlier timestamp in the video and then to edit or re-record the video at that point. This dynamic editing is shown in FIG. 8, which presents a drawing illustrating an example of the use of an electronic device in FIG. 1 to modify content. In particular, the user may move to a particular timestamp 812 in a video 810, and then the user may record 814 new video 816 or content starting at this point. For example, a user may scrub through the previous recordings by swiping a finger across the screen, pausing at any specific point or timestamp 812 in video 810, and then pressing or activating a record button to start recording 814 new content at exactly that point. The software application may instruct the one or more servers in the collaborative video hosting platform may delete the previously recorded content after this point in video 810, and may append new recorded video 816 beginning at this point, up to the aggregate video length. In this way, the user can scrub and then append new recording content 816 to video 810 at an arbitrary timestamp or temporal location to create video 818.

While the preceding discussion used real-time uploading of acquired video as an illustrative example, in other embodiments the video may be buffered, at least temporarily, on the source electronic device. This client buffering of video may be useful when a network connection is unavailable or when there is insufficient bandwidth to communicate the video (or, more generally, the content) to the one or more servers in the collaborative video hosting platform.

This approach may allow videos to be recorded and shared even when the recording is taking place in an environment with no or low bandwidth. Instead, the source electronic device or cellular telephone may locally buffer or store the video. Moreover, this local storage may continue until sufficient bandwidth is available. Consequently, the software application may allow a user to record video at times and locations that are not conducive to sharing and then to share the video when the environment improves.

Moreover, while the preceding discussion uses streaming of video as an illustration of providing the content, in other embodiments other types of content may be provided to a user in a discontinuous stream or in a continuous stream. For example, there may be a temporal stream of images (such as photographs). Similarly, in some embodiments a temporal stream of audio clips and associated video clips may be concurrently presented to the user. Thus, the communication technique may be used with a wide variety of different types of content (in a wide variety of formats) and/or combinations of different types of content, including: audio, video, images, music, songs, books, articles, presentations, emails, tweets (or written messages having a restricted maximum number of characters per message), voicemails, text messages, letters, notes, word-processing documents, spreadsheets, multimedia, etc. In the case of written content, a voice synthesizer may be used to automatically convert the text into sounds that can be provided to the user.

Furthermore, in some embodiments grid image 400 is used in the context of video conferencing. In particular, thumbnails 410 may include real-time video of the video conference participants. This approach may provide video conferencing with speaker management and concurrent non-verbal feedback from speakers via a tiled image in a user interface.

Additionally, in some embodiments the collaborative video hosting platform provides application programming interfaces that facilitate plug-and-play compatibility between the software application and other applications. For example, content may be selectively shared with a recipient that is using another application based on a user instruction. In particular, the one or more servers in the collaborative video hosting platform may provide ephemeral links to content contained within a virtual environment to the other application. A unique token for that instance of sharing of the content may be embedded in a link. If the unique token is disabled or changed in response to an un-share command, the link may be cancelled. In some embodiments, the collaborative video hosting platform provides a window or a container that is embedded in a user interface of the other application. This window may be cordoned off from the other application and may display content (such as a video stream) from the one or more servers in the collaborative video hosting platform.

We now describe embodiments of the electronic device. FIG. 9 presents a block diagram illustrating an electronic device 900, such as one of electronic devices 110, optional base station 114, optional access point 118 and/or computer system 120 in FIG. 1. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program module 922 or operating system 924), which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 may store a data structure that is used during the communication technique. This is shown in FIG. 10, which presents a drawing illustrating an example of a data structure 1000 that is used by electronic device 900 (FIG. 9). In particular, data structure 1000 may include multiple entries 1010. A given entry, such as entry 1010-1 may include: an identifier 1012-1 of a creator, an identifier 1014-1 of a recipient or a group of recipients, secure content 1016-1, unique token 1018-1 that can be used to access content in secure content 1016-1, and/or an optional flag 1020-1 that can be used to enable or disable unique token 1018-1.

Referring back to FIG. 9, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918, one or more antennas 920 and/or input/output (I/O) port 930. (While FIG. 9 includes one or more antennas 920, in some embodiments electronic device 900 includes one or more nodes 908, e.g., a pad, which can be coupled to one or more antennas 920. Thus, electronic device 900 may or may not include one or more antennas 920.) For example, networking subsystem 914 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc. Moreover, electronic device 900 may include a user-input subsystem 932 for receiving user inputs, such as a user input corresponding to a share or an un-share command, or a user selection of available content for viewing.

Electronic device 900 can be (or can be included in) any electronic device with at least one network interface. For example, electronic device 900 can be (or can be included in): a desktop computer, a laptop computer, a subnotebook/netbook, a server, a tablet computer, a smartphone, a cellular telephone, a smart watch, a consumer-electronic device, a portable computing device, an access point, a router, a switch, communication equipment, test equipment, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, display subsystems and/or audio subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments, some or all of a given subsystem or component can be integrated into one or more of the other subsystems or component(s) in electronic device 900. For example, in some embodiments program module 922 is included in operating system 924.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 914, such as a radio. Moreover, the integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving a temporal stream of audio clips and/or video clips, etc.)

While communication protocols compatible with a cellular-telephone network and/or Wi-Fi were used as illustrative examples, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 922, operating system 924 (such as a driver for interface circuit 918) and/or in firmware in interface circuit 918. Alternatively or additionally, at least some of the operations in the communication technique may be implemented in a physical layer, such as hardware in interface circuit 918.

In the preceding description, we refer to 'some embodiments.' Note that 'some embodiments' describes a subset of all of the possible embodiments, but does not always specify the same subset of embodiments. Moreover, note that the numerical values provided are intended as illustrations of the communication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A device, comprising:
   a first image sensor facing a first direction;
   a second image sensor facing a second direction different from the first direction;
   a processor; and
   a memory in communication with the processor, the memory comprising executable instructions that, when executed, cause the processor to control the device to perform functions of:
   using the first and second image sensors, generating content comprising a first video image captured by the first image sensor and a second video image captured by the second image sensor, wherein the content is generated such that the first video image is smoothly transitioned to the second video image by fading out and in, respectively, without an interval between the first and second video images;
   generating secure content containing the generated content;
   via a communication network, transmitting the secure content to a first remote device configured to store the secure content;
   receiving a share command to enable a first recipient to view the content, wherein the first recipient is associated with a second remote device in communication with the first remote device via the communication network;
   in response to the received share command, transmitting a first unique token to the first remote device via the communication network, wherein the first unique token is associated with the first recipient and enables the first remote device to obtain the content from the secure content and share the obtained content with the second remote device via the communication network;
   receiving an un-share command to disable an ability of the first recipient to view the content; and
   in response to the un-share command, via the communication network, transmitting to the first remote device an instruction to disable the first unique token on the first remote device.

2. The device of claim 1, wherein, when the content is selectively shared with a second recipient, a second unique token that is associated with the second recipient is, via the communication network, transmitted to the first remote device, which allows the first remote device to access the content in the secure content so that the first remote device can provide the content to a third remote device that is associated with the second recipient.

3. The device of claim 1, wherein disabling the first unique token includes one of:
   changing a value of a flag on the first remote device;
   erasing the first unique token on the first remote device; and
   changing the first unique token on the first remote device.

4. The device of claim 1, wherein the first unique token includes a key that facilitates access to the secure content.

5. The device of claim 1, wherein the instructions further include instructions that, when executed by the processor, cause the processor to control the device to perform functions of:
   receiving a re-share command to re-enable the first recipient to view the content; and
   in response to the received re-share command, re-activating the first unique token on the first remote device, wherein the re-activating of the first unique token re-enables the second remote device to view the content, wherein the re-activated first unique token allows the first remote device to access the content in the secure content so that the first remote device once again has the ability to provide the content to the second remote device.

6. The device of claim 1, wherein the device, first remote device and second remote device provide a secure end-to-end virtual container for the content.

7. The device of claim 1, further comprising a microphone for continuously capturing a sound when the first and second video images are captured by the first and second image sensors, respectively, wherein the instructions further include instructions that, when executed by the processor, cause the processor to control the device to perform a function of aligning the first and second video images with the captured sound.

8. The device of claim 1, wherein the instructions further include instructions that, when executed by the processor, cause the processor to control the device to perform a function of locking an orientation of the first and second video images when the first and second video images are captured by the first and second image sensors.

9. A method comprising:
at a user device, generating content using first and second image sensors facing first and second directions, respectively, the content comprising a first video image captured by the first image sensor and a second video image captured by the second image sensor, wherein the content is generated such that the first video image is smoothly transitioned to the second video image by fading out and in, respectively, without an interval between the first and second video images;
at the user device, generating secure content containing the generated content;
via a communication network, from the user device transmitting the secure content to a first remote device configured to store the secure content;
at the user device, receiving a share command to enable a first recipient to view the content, wherein the first recipient is associated with second remote device in communication with the first remote device via the communication network;
in response to the received share command, via the communication network, transmitting a first unique token to the first remote device, wherein the first unique token is associated with the first recipient and enables the first remote device to obtain the content from the secure content and share the obtained content with the second remote device via the communication network;
at the user device, receiving an un-share command to disable an ability of the first recipient to view the content; and
in response to the un-share command, via the communication network, transmitting to the first remote device, an instruction to disable the first unique token on the first remote device.

10. The method of claim 9, wherein, when the content is selectively shared with a second recipient, a second unique token that is associated with the second recipient is, via the communication network, transmitted to the first remote device, which allows the first remote device to access the content in the secure content so that the first remote device can provide the content to a third remote device that is associated with the second recipient.

11. The method of claim 9, wherein disabling the first unique token includes one of:
changing a value of a flag on the first remote device;
erasing the first unique token on the first remote device; and
changing the first unique token on the first remote device.

12. The method of claim 9, wherein the first unique token includes a key that facilitates access to the secure content.

13. The method of claim 9, further further comprising:
at the user device, receiving a re-share command to re-enable the first recipient to view the content; and
in response to the received re-share command, re-activating the first unique token on the first remote device, wherein the re-activated first unique token allows the first remote device to access the content in the secure content so that the first remote device once again has the ability to provide the content to the second remote device.

14. The method of claim 9, further comprising:
continuously capturing a sound when the first and second video images are captured by the first and second image sensors, respectively; and
aligning the first and second video images with the captured sound.

15. The method of claim 9, further comprising locking an orientation of the first and second video images when the first and second video images are captured by the first and second image sensors.

16. A device comprising:
means for capturing a first video image;
means for capturing a second video image;
means for generating content comprising the first and second video images, wherein the content is generated such that the first video image is smoothly transitioned to the second video image by fading out and in, respectively, without an interval between the first and second video images;
means for generating secure content containing the generated content;
means for, via a communication network, transmitting the secure content to a first remote device configured to store the secure content;
means for receiving a share command to enable a first recipient to view the content, wherein the first recipient is associated with second remote device in communication with the first remote device via the communication network;
means for, in response to the received share command, transmitting a first unique token to the first remote device via the communication network, wherein the first unique token is associated with the first recipient and enables the first remote device to obtain the content from the secure content and share the obtained content with the second remote device via the communication network;
means for receiving an un-share command to disable an ability of the first recipient to view the content; and
means for, in response to the un-share command, transmitting an instruction to disable the first unique token on the first remote device to the first remote device via a communication network.

17. The device of claim 16, wherein, when the content is selectively shared with a second recipient, a second unique token that is associated with the second recipient is, via the communication network, transmitted to the first remote device, which allows the first remote device to access the content in the secure content so that the first remote device can provide the content to a third remote device that is associated with the second recipient.

18. The device of claim 16, wherein the first unique token is disabled by one of:
changing a value of a flag on the first remote device;
erasing the first unique token on the first remote device; and
changing the first unique token on the first remote device.

19. The device of claim 16, wherein the first unique token includes a key that facilitates access to the secure content.

20. The device of claim 16, further comprising:
means for receiving a re-share command to re-enable the first recipient to view the content; and
means for re-activating, in response to the received re-share command, the first unique token on the first remote device, wherein the re-activated first unique token allows the first remote device to access the content in the secure content so that the first remote device once again has the ability to provide the content to the second remote device.

* * * * *